US009866601B2

(12) United States Patent
Hinohara et al.

(10) Patent No.: US 9,866,601 B2
(45) Date of Patent: Jan. 9, 2018

(54) COMMUNICATION SYSTEM, COMMUNICATION APPARATUS, AND METHOD OF PROGRAM UPDATE

(71) Applicants: Hiroshi Hinohara, Kanagawa (JP); Shigeru Nakamura, Kanagawa (JP); Hiroyuki Kanda, Kanagawa (JP)

(72) Inventors: Hiroshi Hinohara, Kanagawa (JP); Shigeru Nakamura, Kanagawa (JP); Hiroyuki Kanda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 405 days.

(21) Appl. No.: 14/617,381

(22) Filed: Feb. 9, 2015

(65) Prior Publication Data
US 2015/0237089 A1 Aug. 20, 2015

(30) Foreign Application Priority Data

Feb. 17, 2014 (JP) .................. 2014-027779

(51) Int. Cl.
G06F 15/173 (2006.01)
H04L 29/06 (2006.01)
H04L 29/08 (2006.01)
H04N 21/226 (2011.01)
H04N 21/442 (2011.01)
H04N 21/458 (2011.01)

(52) U.S. Cl.
CPC .......... *H04L 65/4038* (2013.01); *H04L 67/32* (2013.01); *H04N 21/2265* (2013.01); *H04N 21/44209* (2013.01); *H04N 21/4586* (2013.01)

(58) Field of Classification Search
USPC .......... 709/223, 224, 227, 229, 232
See application file for complete search history.

(56) References Cited

U.S. PATENT DOCUMENTS 7,426,182 B1 * 9/2008 Wang .................. H04M 7/0072
370/235
7,822,869 B2 * 10/2010 Zuckerman ......... H04L 67/1008
709/226

(Continued)

FOREIGN PATENT DOCUMENTS

JP 2012-084118 4/2012

OTHER PUBLICATIONS

U.S. Appl. No. 14/511,406, filed Oct. 10, 2014, Nakamura.

Primary Examiner — Liangche A Wang
(74) Attorney, Agent, or Firm — Oblon, McClelland, Maier & Neustadt, L.L.P.

(57) ABSTRACT

A communication system is provided that includes a communication terminal that stores at least one program and a plurality of update apparatuses that provide update data for updating the program to the communication terminal. The communication terminal includes a memory that stores update apparatus information associated with communication bandwidth information, and processing circuitry that calculates an actual bandwidth obtained from a previous downloading of previous update data, determines an update apparatus for downloading next update data based on the calculated actual bandwidth and the update apparatus information stored in the memory, and downloads the next update data from the determined update apparatus.

9 Claims, 14 Drawing Sheets

(56) References Cited

U.S. PATENT DOCUMENTS

| | | | | |
|---|---|---|---|---|
| 7,996,495 B2* | 8/2011 | Dekel | ................... | G06F 19/321 |
| | | | | 382/232 |
| 8,442,062 B2* | 5/2013 | Namgung | ........... | H04L 12/1818 |
| | | | | 370/235 |
| 9,621,425 B2* | 4/2017 | Zhang | ................ | H04L 41/0896 |
| 2005/0243745 A1* | 11/2005 | Stanwood | ............. | H04W 72/10 |
| | | | | 370/280 |
| 2010/0077096 A1* | 3/2010 | Philip | ............... | G06F 17/30194 |
| | | | | 709/233 |
| 2010/0091699 A1* | 4/2010 | Wu | .................... | H04B 7/18584 |
| | | | | 370/316 |
| 2011/0158233 A1* | 6/2011 | Namgung | ........... | H04L 12/1818 |
| | | | | 370/390 |
| 2012/0072895 A1* | 3/2012 | Koyama | ................... | G06F 8/65 |
| | | | | 717/168 |
| 2012/0141089 A1* | 6/2012 | Hunt | ............... | H04N 21/23439 |
| | | | | 386/239 |
| 2012/0201255 A1* | 8/2012 | Manor | ............... | H04N 21/2385 |
| | | | | 370/468 |
| 2013/0012251 A1* | 1/2013 | Roddy | ................ | H04W 28/08 |
| | | | | 455/509 |
| 2014/0075025 A1* | 3/2014 | Stanforth | ............. | H04W 48/14 |
| | | | | 709/225 |
| 2014/0173055 A1* | 6/2014 | Yu | ........................ | H04L 65/607 |
| | | | | 709/219 |

* cited by examiner

| TIME | AVERAGE VALUE OF BANDWIDTHS USED FOR DOWNLOADING |
|---|---|
| JUNE, 3, 2013 | 300 [Kbps] |
| MARCH, 1, 2013 | 430 [Kbps] |
| DECEMBER, 1, 2012 | 280 [Kbps] |

| BANDWIDTH INFORMATION | UPDATE SERVER |
|---|---|
| LESS THAN 200Kbps | https://update-60c.example.com/ |
| 200Kbps-LESS THAN 1Mbps | https://update-60b.example.com/ |
| MORE THAN 1Mbps | https://update-60a.example.com/ |

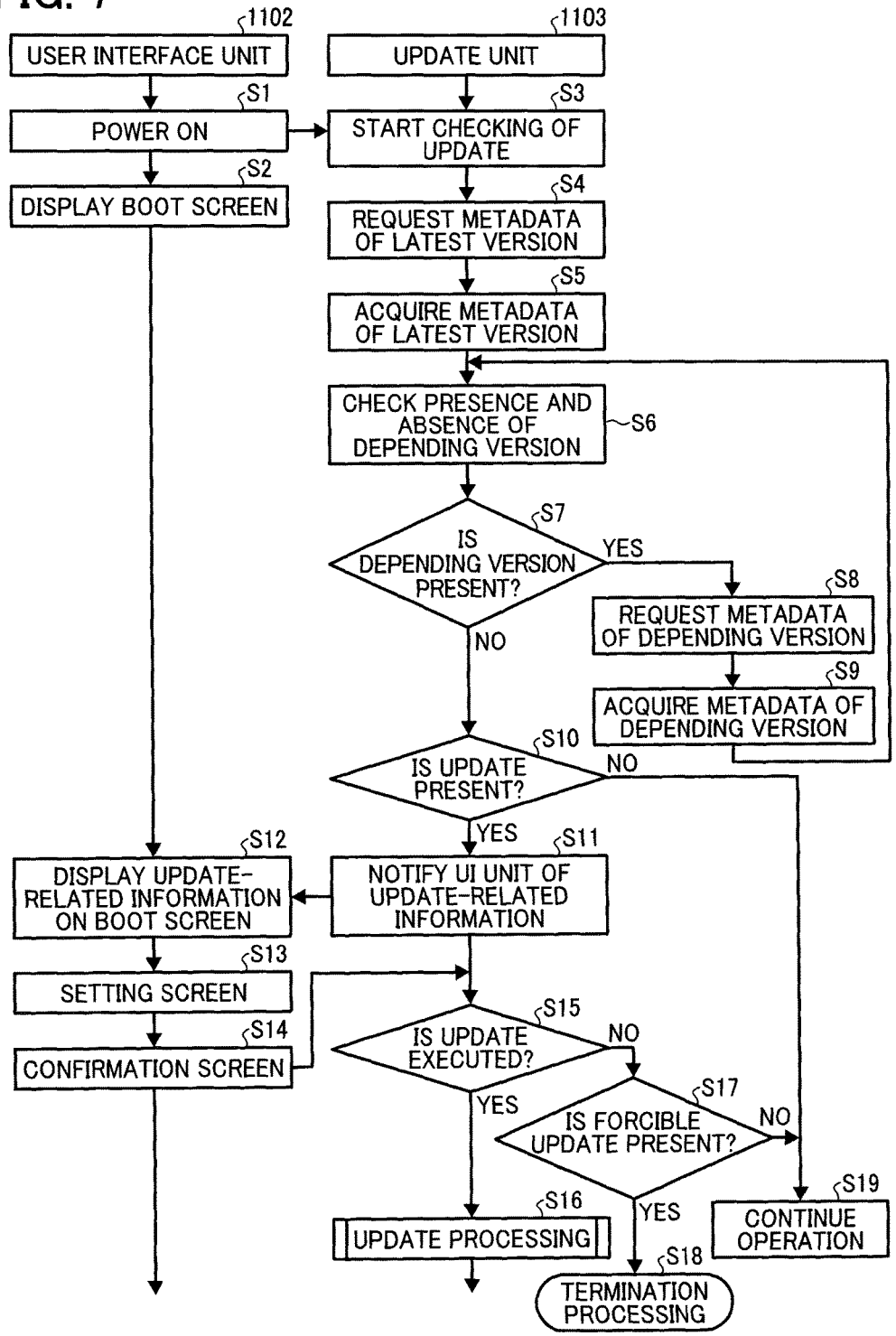

FIG. 8

```
{
    "version" : "1.0.2",
    "dependency" : "1.0.1",
    "description" : "It is a sample data.",
    "servers" : [
      {
        "max bandwidth": 204800,
        "min bandwidth": 0,
        "url": "https://update-60c.example.com",
      },
      {
        "max bandwidth": 1048576,
        "min bandwidth": 204800,
        "url": "https://update-60b.example.com",
      },
      {
        "max bandwidth": 0,
        "min bandwidth": 1048576,
        "url": "https://update-60a.example.com",
      },
    ],
    "files" : [
      {
        "path": "1.0.2/1.dat",
        "digest": "e049.....41e",
      },
      {
        "path": "1.0.2/2.dat",
        "digest": "7467.....14f",
      },
      {
        "path": "1.0.2/3.dat",
        "digest": "ed04.....c16",
      },
    ],
    "scriptname" : "update.dup",
    "require_reboot" : true,
    "force_update" : true,
}
```

COMMUNICATION SYSTEM, COMMUNICATION APPARATUS, AND METHOD OF PROGRAM UPDATE

CROSS-REFERENCE TO RELATED APPLICATIONS

This patent application is based on and claims priority pursuant to 35 U.S.C. §119 to Japanese Patent Application No. 2014-027779, filed on Feb. 17, 2014, in the Japan Patent Office, the entire contents of which are incorporated herein by reference.

BACKGROUND

Technical Field

The present disclosure relates to a communication system, a communication apparatus, and a communication method.

Description of the Related Art

Conference systems that hold a remote conference between users at remote places through a communication network, such as the Internet, have been widely used. With the conference system, in a conference room of one of the parties of the conference, images of the conference room and audio, such as remarks thereof, are image-captured and collected using a terminal device of the remote conference system. Then, the captured data is converted to digital data and transmitted to a terminal device of the other party. In a conference room of the other party, the images are displayed on a display and the audio is output through a speaker. Thus, techniques of holding a conference between users at remote places in a state close to an actual conference are known.

In the conference system, firmware (programs and applications) are periodically updated in some cases in order to improve call security performance and operation performance. The following method has been known as a method of updating the program in the conference system. That is, update data and meta information (metadata) are acquired by accessing a server through a network so as to update the program, and a program version that depends on this program.

Japanese Patent Application Laid-open No. 2012-084118 discloses the following update method. The update method includes determining whether an update is necessary for a communication device, receiving a selection operation from a user indicating whether the update is to be executed when the update is present, and executing the update when the selection operation for executing the update is made.

SUMMARY

In one embodiment, there is provided a communication system that includes a communication terminal that stores at least one program, and a plurality of update apparatuses that provide update data for updating the program to the communication terminal. The communication terminal includes a memory that stores update apparatus information associated with communication bandwidth information, and processing circuitry that calculates an actual bandwidth obtained from a previous downloading of previous update data, determines an update apparatus for downloading next update data based on the calculated actual bandwidth and the update apparatus information stored in the memory, and downloads the next update data from the determined update apparatus.

BRIEF DESCRIPTION OF THE DRAWINGS

FIG. 7 is a flowchart illustrating an example of operations of the communication terminal;

DETAILED DESCRIPTION

Hereinafter, a communication system according to the enclosed embodiments will be described in detail with reference to the accompanying drawings.

Figure 1:
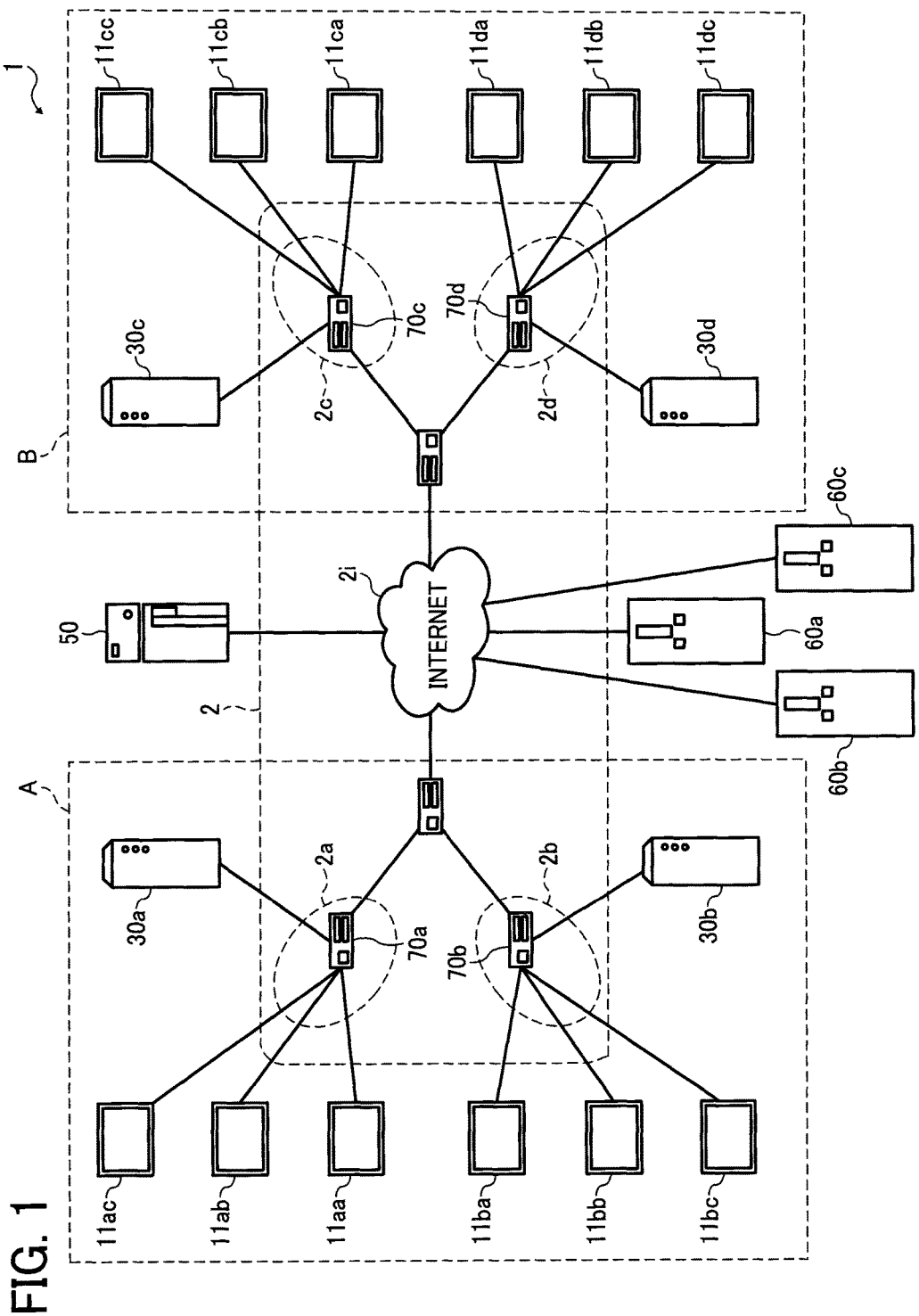
FIG. 1 is a schematic view illustrating a configuration of a remote communication system.

FIG. 1 is a schematic view illustrating the configuration of a remote communication system (communication system) 1 according to one embodiment. As illustrated in FIG. 1, the remote communication system 1 is a system in which communication terminals (terminals) 11aa to 11ac, 11ba to 11bc, 11ca to 11cc, and 11da to 11dc as communication devices, a remote communication management server 50, update servers 60a to 60c, and routers 70a to 70d are connected with a communication network 2 in a communicable manner. To be specific, the remote communication system 1 is configured to include LANs 2a, 2b, 2c, and 2d connected to an Internet 2i through the routers 70a to 70d, the remote communication management server 50, the update servers 60a, 60b, and 60c, the communication terminals 11aa to 11ac and a relay device 30a connected to the LAN 2a, the communication terminals 11ba to 11bc and a relay device 30b connected to the LAN 2b, the communication terminals 11ca to 11cc and a relay device 30c connected to the LAN 2c, and the communication terminals 11da to 11dc and a relay device 30d connected to the LAN 2d. In the remote communication system 1, the respective communication terminals 11aa to 11ac and 11ba to 11bc in an area A and the respective communication terminals 11ca to 11cc and 11da to 11dc in an area B transmit and receive audio or video images to and from each other via relay of communication data with the relay devices 30a, 30b, 30c, and 30d, establishing a call under management of the remote communication management server 50.

To be specific, the remote communication management server 50 manages pieces of information including the communication addresses of the communication terminals 11aa to 11ac, 11ba to 11bc, 11ca to 11cc, and 11da to 11dc and the relay devices 30a, 30b, 30c, and 30d, the communication terminals relayed by the respective relay devices 30a, 30b, 30c, and 30d, and call states of the respective communication terminals. For example, when the communication terminal 11aa makes a call to the communication terminal 11ca, it requests the relay device 30a to relay the call to the communication terminal 11ca. The relay device 30a notifies the remote communication management server 50 of the start of the call of the communication terminal 11aa, and acquires the communication address of the relay device 30c for relaying the call to the communication terminal 11ca from the remote communication management server 50. Then, the relay device 30a requests the relay device 30c to relay the call to the communication terminal 11ca, and the relay device 30c starts a communication session with the communication terminal 11ca. Subsequently, the relay device 30c notifies the remote communication management server 50 of the start of the communication session with the communication terminal 11ca.

In this manner, a call between the communication terminal 11aa and the communication terminal 11ca is started through the relay devices 30a and 30c. The remote communication management server 50 manages a state where the communication terminal 11aa and the communication terminal 11ca are on a call. For example, when the remote communication management server 50 receives an inquiry about the call status of the communication terminal 11aa or the communication terminal 11ca from the communication terminal 11ab, it returns a fact that they are online during the call.

In the following description, when an arbitrary device among the devices of the same type is described, a reference numeral omitting letters subsequent to numerals is used. For example, the communication terminals 11aa to 11ac, 11ba to 11bc, 11ca to 11cc, and 11da to 11dc are abbreviated as communication terminal 11. The relay devices 30a to 30d are abbreviated as relay device 30.

The update servers 60a to 60c are update information providing devices that manage pieces of update-related information of programs and various pieces of setting information of the communication terminal 11, and provide the pieces of information thereof in response to a request from the communication terminal 11. The pieces of update-related information include data files of all versions from the past versions to the latest versions of the programs and the various pieces of setting information of the communication terminal 11, update contents for the respective versions, and pieces of metadata (relevant information) describing information relating to division of update data, which will be described later. The update servers 60a to 60c manage the pieces of data of all the versions as the pieces of update-related information because the timing at which the respective communication terminals 11 update are different from one another.

For example, a communication terminal 11 that updates frequently might update to the latest version only, whereas a communication terminal 11 that updates at a long interval might update after repeating version upgrade several times. In such a case, the communication terminal 11 does not update to the latest version directly, but updates to an old version having a dependency relationship with the latest version, for example. Thus, the communication terminal 11 experiences an update to the old version having the dependency relationship, so that the update servers 60a to 60c manage the pieces of data of all the versions as the pieces of update-related information.

Each of the update servers 60a to 60c has different communication bandwidth (bandwidth limitation). For example, the update server 60a is able to communicate without any bandwidth limitation, the update server 60b is able to communicate using a bandwidth of below 1 Mbps, and the update server 60c is able to communicate using a bandwidth of less than 200 kbps. Further, the update servers are not limited to only three servers. Further, instead of the update servers 60a to 60c, a single update server may change the value of the bandwidth limitation corresponding to each of the files, or change the value of the bandwidth dynamically corresponding to the content of a request for a common file. In the following description, where any one of a plurality of constituent parts, such as the update servers 60a to 60c, is to be mentioned without specifying which, it may be referred to simply as the "update server 60," for instance.

There are two update types: normal update and forcible update. The normal update is an update that is executed in order to cope with failures, such as bugs and added functions.

The forcible update is an update in order to execute the update forcibly with change of a device or a function that is different from the functions of the communication terminal 11. For example, a data format or a video codec of audio and images that are transmitted and received in the call is changed in the relay device 30, or an updated version of the relay device 30 relating to video images, such as update of an encoder, is executed in some cases. Furthermore, a communication protocol used with the relay device 30 is changed in some cases. These changes involve a change in the structure of the audio, the images, and the video images themselves, a change in communication procedures themselves with the relay device 30 with the change of the communication protocol, or a change in the functions of the relay device 30. Thus, when the above-mentioned changes occur, the communication terminal 11 prior to being updated cannot establish a call as an original function of the communication terminal 11. In such a case, a forcible update is executed to cause the communication terminal 11 to adapt to the updated version of the relay device 30.

Further, there is a problem in security, e.g., the case where a security hole is found in the communication terminal 11. A forcible update corresponding to the security hole is executed for the communication terminal 11 when the security hole is discovered, because a communication terminal 11 that has a security hole is a security risk.

Figure 2:
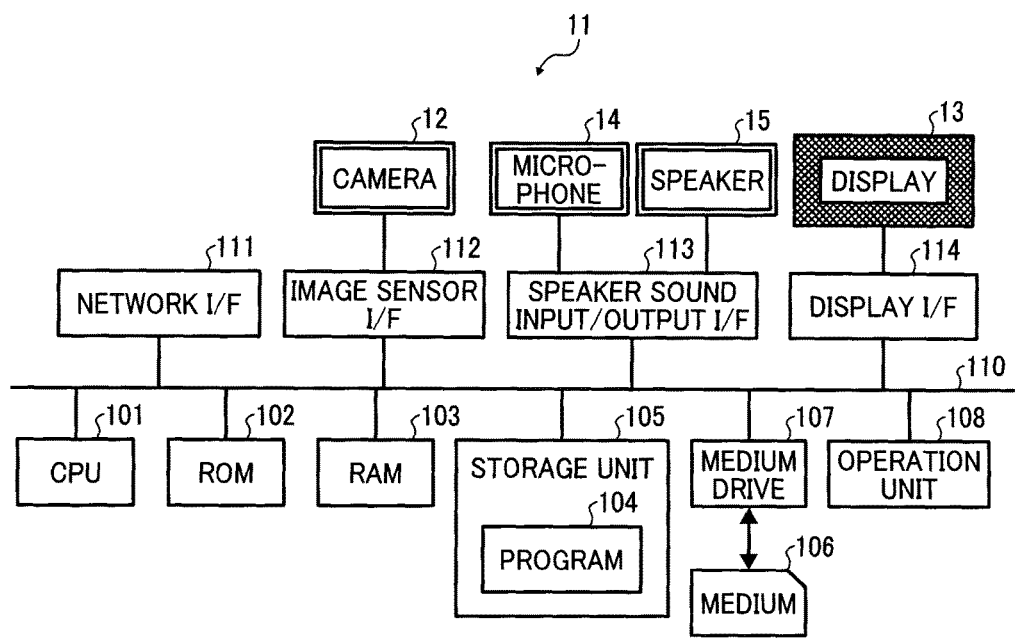
FIG. 2 is a block diagram illustrating a hardware configuration of a communication terminal.

The following describes the hardware configuration of the communication terminal 11. FIG. 2 is a block diagram illustrating the hardware configuration of the communication terminal 11. As illustrated in FIG. 2, the communication terminal 11 includes a central processing unit (CPU) 101, a read only memory (ROM) 102, a random access memory (RAM) 103, a storage unit (memory) 105, a medium drive 107, an operation unit 108 (computer interface), a network I/F 111, an image capturing element I/F 112, an audio input/output I/F 113, and a display I/F 114, and the respective units are configured to be connected to one another through a bus 110.

The CPU 101 obtains a program 104 stored in the ROM 102 or the storage unit (memory) 105 or the RAM 103 and executes it sequentially so as to control operations of the communication terminal 11 centrally. The storage unit 105 is a hard disk drive (HDD), a solid state drive (SSD), or the like and stores therein data in a readable/writable manner. To be specific, the storage unit 105 stores therein the program 104 that is executed by the CPU 101 and various pieces of setting information. Upon update, the program 104 and the various pieces of setting information stored in the storage unit 105 are updated.

The medium drive 107 is a drive device that performs reading/wiring from/into a medium 106 such as an optical disk. The operation unit 108 is a keyboard, various operation keys, a touch panel that is laminated and arranged on a display 13, or the like, and receives operation input by the user. The network I/F 111 is an interface that is connected to the communication network 2 and performs data communication. The image capturing element I/F 112 is an interface that is connected to a camera 12 as a digital camera and acquires an image captured by the camera 12. The audio input/output I/F 113 is an interface that is connected to a microphone 14 and a speaker 15, inputs audio through the microphone 14 and outputs audio through the speaker 15. The display I/F 114 is an interface that is connected to the display 13, such as a liquid crystal display (LCD), and outputs display data to the display 13.

Although the display 13 is used in the embodiment, another display device such as a projector may be connected instead of the display 13.

The communication terminal 11 outputs an image acquired from the camera 12 or the audio input through the microphone 14 to the relay device 30 via the network I/F 111 when establishing a call to another communication terminal, for example, under control of the CPU 101 executing the program 104. Furthermore, the communication terminal 11 outputs audio from another communication terminal that has been relayed by the relay device 30 and input via the network I/F 111 through the speaker 15, and displays images from another communication terminal on the display 13 in the same manner. In this manner, the communication terminal 11 establishes a call with another communication terminal through the images and the audio, that is, what is called a teleconference.

Figure 3:
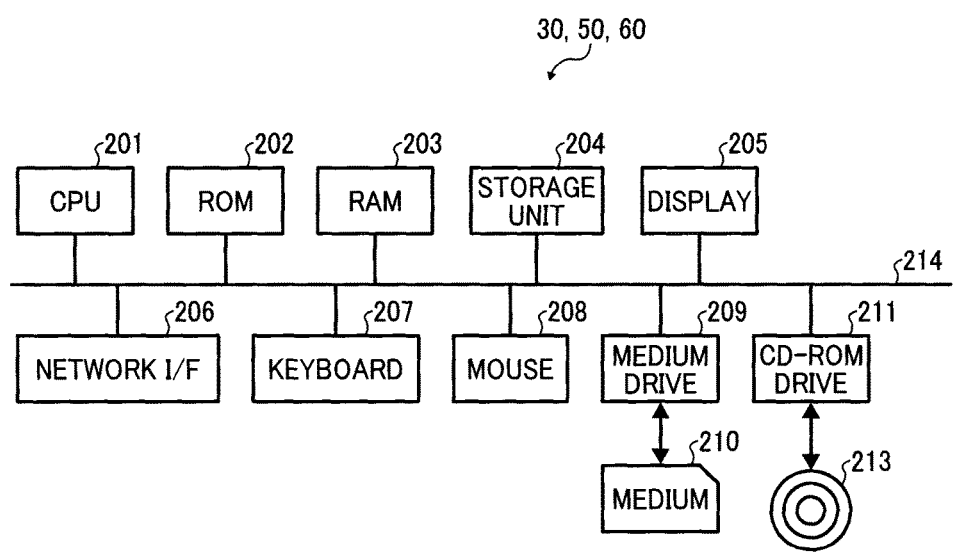
FIG. 3 is a block diagram illustrating hardware configurations of a relay device, a remote communication management server, and an update server.

The following describes the hardware configurations of the relay device 30, the remote communication management server 50, and the update servers 60. FIG. 3 is a block diagram illustrating the hardware configurations of the relay device 30, the remote communication management server 50, and the update server 60. As illustrated in FIG. 3, each of the relay devices 30, the remote communication management server 50, and the update servers 60 includes a CPU 201, a ROM 202, a RAM 203, a storage unit 204, a display 205, a network I/F 206, a keyboard 207, a mouse 208, a media drive 209, and a CD-ROM drive 211, and the respective parts are configured to be connected to one another through a bus 214. Each of the relay devices 30, the remote communication management server 50, and the update servers 60 is an apparatus such as a personal computer (PC) or a work station (WS).

The CPU 201 obtains a program stored in the ROM 202 or the storage unit 204 on the RAM 203 and executes it sequentially so as to control operations of the device centrally. The storage unit 204 is a HDD, an SSD, or other memory circuit and stores therein data in a readable/writable manner. For example, in the update server 60, update-related information and the like are stored in the storage unit 204.

The display 205 is a liquid crystal display (LCD), for example. The network I/F 206 is an interface that is connected to the communication network 2 and performs data communication. The keyboard 207 and the mouse 208 receive operation input by the user. The media drive 209 is a drive device that performs reading/writing from/into a medium 210, such as the optical disk. The CD-ROM drive 211 is a drive device that performs reading from a CD-ROM 213. For example, in the update server 60, the latest update-related information is provided by the medium 210 or the CD-ROM 213 and is stored in the storage unit 204.

Figures 4, 5, 6:
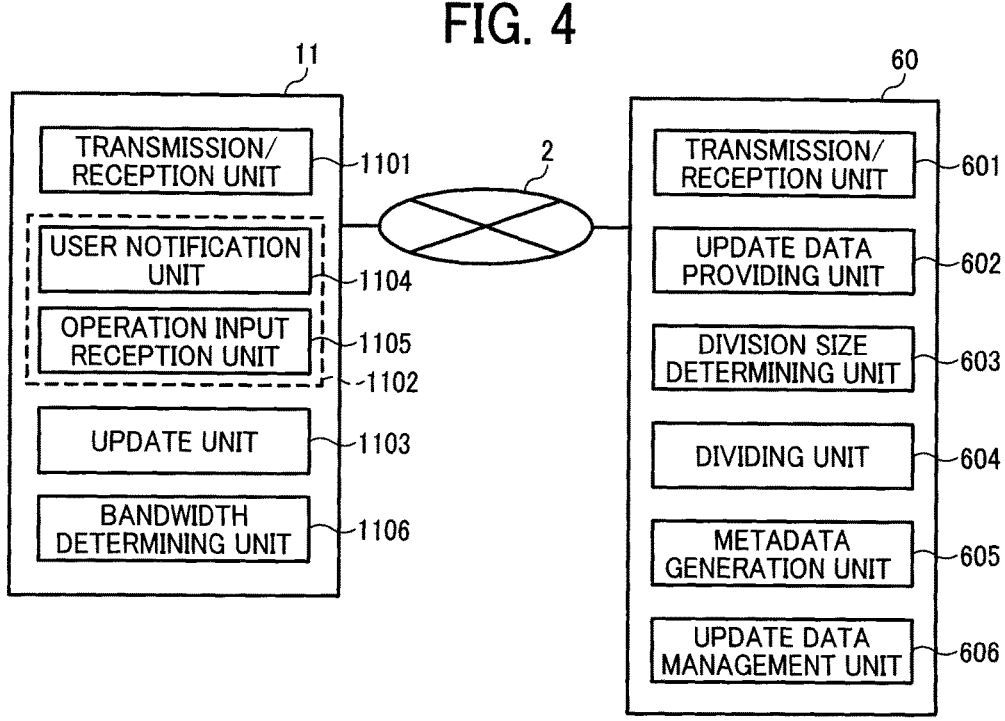
FIG. 4 is a block diagram illustrating functions of the communication terminal and the update server.
FIG. 5 is a table illustrating an example of a reception history that is used when a bandwidth determining unit determines a bandwidth capable of being used for communication.
FIG. 6 is a table illustrating a bandwidth information table that is used when the communication terminal determines another update server corresponding to an available communication band.

The following describes the functions of the communication terminal 11 and the update server 60 in detail. FIG. 4 is a block diagram illustrating the functions of the communication terminal 11 and the update server 60. The respective functions of the communication terminal 11 and the update server 60 may be configured by a CPU that executes software or other special-purpose hardware.

The communication terminal (communication device) 11 includes a transmission/reception unit 1101, a user interface unit 1102, an update unit 1103, a bandwidth determining unit 1106, and receives update data for an application and performs an update. The transmission/reception unit 1101 transmits and receives data to and from the update server 60 through the communication network 2. To be specific, the transmission/reception unit 1101 transmits and receives data to and from the update server 60a, the update server 60b, or the update server 60c by starting a communication session with the update server 60a, the update server 60b, or the update server 60c using a predetermined communication protocol based on the communication address of the update server 60 that has been previously set to setting information or the like in the storage unit 105 or the communication address of the update server 60 that has been acquired from the remote communication management server 50. The bandwidth determining unit 1106 determines the communication terminal 11 that the update servers 60a to 60c use by processing to be described below. The transmission and reception of the data causes the transmission/reception unit 1101 to acquire the update-related information that is managed by the update server 60. Furthermore, the communication terminal 11 notifies the update server 60 of communication bandwidth information used by the communication terminal 11 when transmitting the data. As the communication bandwidth information, information previously sent to the communication terminal through the user interface unit 1102 is used.

The user interface unit 1102 is an interface that controls audio output through the speaker 15, a display screen of the display 13, reception of the operation input with the operation unit 108 by the user, and the like so as to control information transmission between the user and the communication terminal 11. To be specific, the user interface unit 1102 includes a user notification unit 1104 and an operation input reception unit 1105. The user notification unit 1104 performs various notifications to the user with the audio output through the speaker 15 and the display screen of the display 13. The operation input reception unit 1105 receives the operation input with the operation unit 108 by the user.

The update unit 1103 functions as a determination unit and an update processing unit and executes update of the program 104 and the various pieces of setting information stored in the storage unit 105, based on the update-related information that the transmission/reception unit 1101 has acquired from the update server 60. The update that is executed by the update unit 1103 will be described in detail in update processing (step S16) in FIG. 13.

The bandwidth determining unit 1106 determines a communication bandwidth capable of being used for downloading the update data. To be specific, the bandwidth determining unit 1106 determines a bandwidth capable of being used for communication based on a communication bandwidth when update data has been received in the past and sets it as the bandwidth information. The bandwidth determining unit 1106 also has a function of measuring a bandwidth capable of being used for communication before the update data is received, determining a bandwidth capable of being used for communication based on a measurement result, and setting the determined bandwidth as the bandwidth information.

The update server (update apparatus) 60 includes a transmission/reception unit 601, an update data providing unit 602, a division size determining unit 603, a dividing unit 604, a metadata generation unit (relevant information generation unit) 605, and an update data management unit 606. The update server 60 transmits update data and information relating to the update data to the communication terminal 11.

The transmission/reception unit 601 transmits and receives data to and from the communication terminal 11 through the communication network 2. To be specific, the transmission/reception unit 601 transmits and receives the data to and from the communication terminal 11 by starting a communication session using the predetermined communication protocol in response to the request from the communication terminal 11 through the communication network 2. Further, the transmission/reception unit 601 performs the bandwidth limitation for an amount of transmitting data based on the predetermined value.

The update data providing unit 602 provides the update-related information, which is managed by the update server 60, to the communication terminal 11 in response to the request from the communication terminal 11 to and from which the transmission/reception unit 601, which transmits and receives data. Furthermore, the update data providing unit 602 receives a metadata acquisition request and bandwidth information from the communication terminal 11. The bandwidth information is information indicating a bandwidth that the communication terminal 11 can use for communication.

The division size determining unit 603 determines a division size when the update data is divided into a plurality of pieces of data based on the bandwidth information. For example, the division size determining unit 603 has a correspondence table in which correspondence between the bandwidth information and the division size is previously stored in the storage unit 204. The division size determining unit 603 determines the division size when the update data is divided into the pieces of data, in accordance with the bandwidth information of the communication terminal 11 from which the metadata acquisition request has been received, by referring to the correspondence table. For example, when the communication terminal 11 notifies of "400 Kbps" as the bandwidth information when requesting the metadata, the division size determining unit 603 determines the division size to the "512 Kbyte".

The dividing unit 604 divides the update data into the pieces of data using the division size determined by the division size determining unit 603.

The metadata generation unit 605 generates metadata (relevant information) as the information relating to the update data divided into the pieces of data by the dividing unit 604 in combination with the pieces of divided data. An example of the metadata will be TBD.

The update data management unit 606 holds the metadata (relevant information) relating to the update data divided into the pieces of data by the dividing unit 604. The update data management unit 606 can hold pieces of data that have been previously divided. In the same manner for the metadata, the update data management unit 606 can previously hold pieces of metadata corresponding to the pieces of data that have been previously divided.

FIG. 5 is a table illustrating an example of a reception history that is used when the bandwidth determining unit 1106 determines the bandwidth capable of being used for communication. The bandwidth determining unit 1106 calculates an average value of bandwidths used for downloading from the capacity (data size) of downloaded data and the time taken to download when the update data was downloaded in the past. The bandwidth determining unit 1106 of the communication terminal 11 stores the history table illustrated in FIG. 5. The bandwidth determining unit 1106 determines an average value of the communication bandwidth in the latest download, for example, as a usable bandwidth that is notified to the update server 60 at a subsequent update time using the history table, so as to make notification of the bandwidth information. The update server 60 determines a division size corresponding to the bandwidth information notified by the communication terminal 11.

FIG. 6 is a table illustrating an example of a bandwidth information table for determining available communication bandwidth by the communication terminal 11. When the communication terminal 11 obtains the update data from the update server 60, the communication terminal 11 compares the reception history shown in FIG. 5 and the bandwidth information in the bandwidth information table shown in FIG. 6, and determines which update server 60 to use. Further, when the communication terminal downloads the metadata (relevant information), the communication terminal 11 stores information of "servers", (to be described using FIG. 8), in the storage unit 204, with the format shown in FIG. 6, and uses the information of "servers" for determining which update server 60a to 60c to use.

FIG. 7 is a flowchart illustrating an example of operations of the communication terminal. As illustrated in FIG. 7, the user interface unit 1102 turns ON the power supply (powers ON) in accordance with an operation with a power supply switch or the like of the operation unit 108 (step S1), and displays a boot screen on the display 13 (step S2). The boot screen is a display screen displaying a list of the call states of the respective communication terminals 11 that have been obtained by inquiry of the remote communication management server 50 under control by the CPU 101 (details thereof will be described below).

The update unit 1103 starts checking update of the terminal at the time of the boot, after the power supply is turned ON at Si (step S3). In the following description, the program is updated, but also various pieces of setting information are updated in the same manner.

When the checking of the update is started, the update unit 1103 requests metadata of the program of the latest version from the update server 60 through the transmission/reception unit 1101 (step S4) and acquires the metadata that the update data providing unit 602 provides in response to the request (step S5).

Details of the metadata will now be described. FIG. 8 is a conceptual view illustrating an example of the metadata. As illustrated in FIG. 8, the metadata of each version has a structure including data items of "version", "dependency", "description", "servers", "files", "scriptname", "require_reboot", "force_update", and the like. The example as illustrated in FIG. 8 indicates that the update data for the application is divided into three files.

A version number like "1.0.2" is set in the field "version". A version number like "1.0.1" indicating another version having a dependency relation with each other is set in the field "dependency". Accordingly, the version number set in the data item of the "dependency" is checked so as to trace a version having the dependency relationship. Details of the version, such as "It is sample data." are set in the field "description".

Information identifying each one of the available update servers 60a to 60c corresponding to each bandwidth is set in the field "servers". The information of "max bandwidth" and "min bandwidth" shown in FIG. 8, corresponding to each of the update servers 60a to 60c, indicates the bandwidth information illustrated in FIG. 6. Further, regarding the numerical value of the bandwidth information, "0" can indicate no limitation, and the other numerical values can indicate the bandwidth on the bps scale. For example, the bandwidth information corresponding to the update server 60a indicates "min bandwidth"=1*1024*1024=1048576 (1 Mbps).

A list and storage destinations of the program (data files) for the update that are managed by the update server 60, and checksums of these data files, are set in the field "files". Accordingly, the update unit 1103 acquires data files through the transmission/reception unit 1101 based on contents set in the data item of the "files", so as to execute the update relating to the version described in the metadata. To be specific, a URL of the update data includes "url" information of the server and "path" information of the file.

A script name that is executed when the update is executed is set in the field "scriptname". A flag ("true" or "false") indicating whether the device is rebooted after execution of the update is set in the field "require_ reboot". A flag ("true" or "false") indicating whether the update is forcible update is set in the field "force_update".

The update of the program 104 involves device control for the network I/F 111, the image capturing element I/F 112, the audio input/output I/F 113, the display I/F 114, etc. in some cases. The update involving the device control requires a reboot after the update. Based on this, "true" is set in the field "require_reboot". As described above, the update of the program 104 includes a normal update and a forcible update. When the forcible update is performed, "true" is set in the field "force_update".

Subsequently, the update unit 1103 checks the presence and absence of a depending version based on the content described in the data item of the "dependency" field in the acquired metadata (step S6). For example, as illustrated in FIG. 8, when a version number indicating another version like "1.0.1" is set in the "dependency" field, it is considered that the depending version is present. On the other hand, when nothing is set in the "dependency" field, it is considered that the depending version is absent.

Next, the update unit 1103 determines whether the depending version is present as a result of the checking at S6 (step S7). If the depending version is present (Yes at step S7), the update unit 1103 requests metadata of the program of the depending version from the update server 60 through the transmission/reception unit 1101 (step S8), and acquires the metadata of the depending version that is provided by the update data providing unit 602 in response to the request (step S9). Then, the process returns to S6. Accordingly, the update unit 1103 traces versions depending on the latest version so as to acquire the metadata relating to the versions.

Subsequently, the update unit 1103 compares the version number set in the "version" field in the metadata of the latest version and a version number of the program 104 stored in the storage unit 105 of the communication terminal so as to determine whether an update is needed (that is to say, whether update has been already performed) (step S10). To be specific, when the version number of the latest version and the version number of the program 104 are identical, it is determined that no update necessary for the communication terminal is present (that is, the update has been already performed) because the program 104 is the latest version. On the other hand, when the version number of the latest version and the version number of the program 104 are not identical, it is determined that update necessary for the communication terminal is present (that is, the update has not been performed) because the program 104 is an old version. If no update is present (No at step S10), it is not necessary to execute the update, so that a normal operation is continued (step S19).

If the update necessary for the communication terminal is present (Yes at step S10), the update unit 1103 notifies the user interface unit 1102 of the update-related information (step S11). To be specific, the update unit 1103 notifies the user interface unit 1102 of data items other than data items unnecessary for the notification to the user, such as "files" and "scriptname", in the metadata of the latest version and the metadata of the version depending on the latest version as the update-related information.

The user notification unit 1104 of the user interface unit 1102 displays the presence of the update necessary for the communication terminal on the boot screen of the display 13 based on the update-related information notified by the update unit 1103 at step S11, so as to notify the user (step S12).

Figure 9:
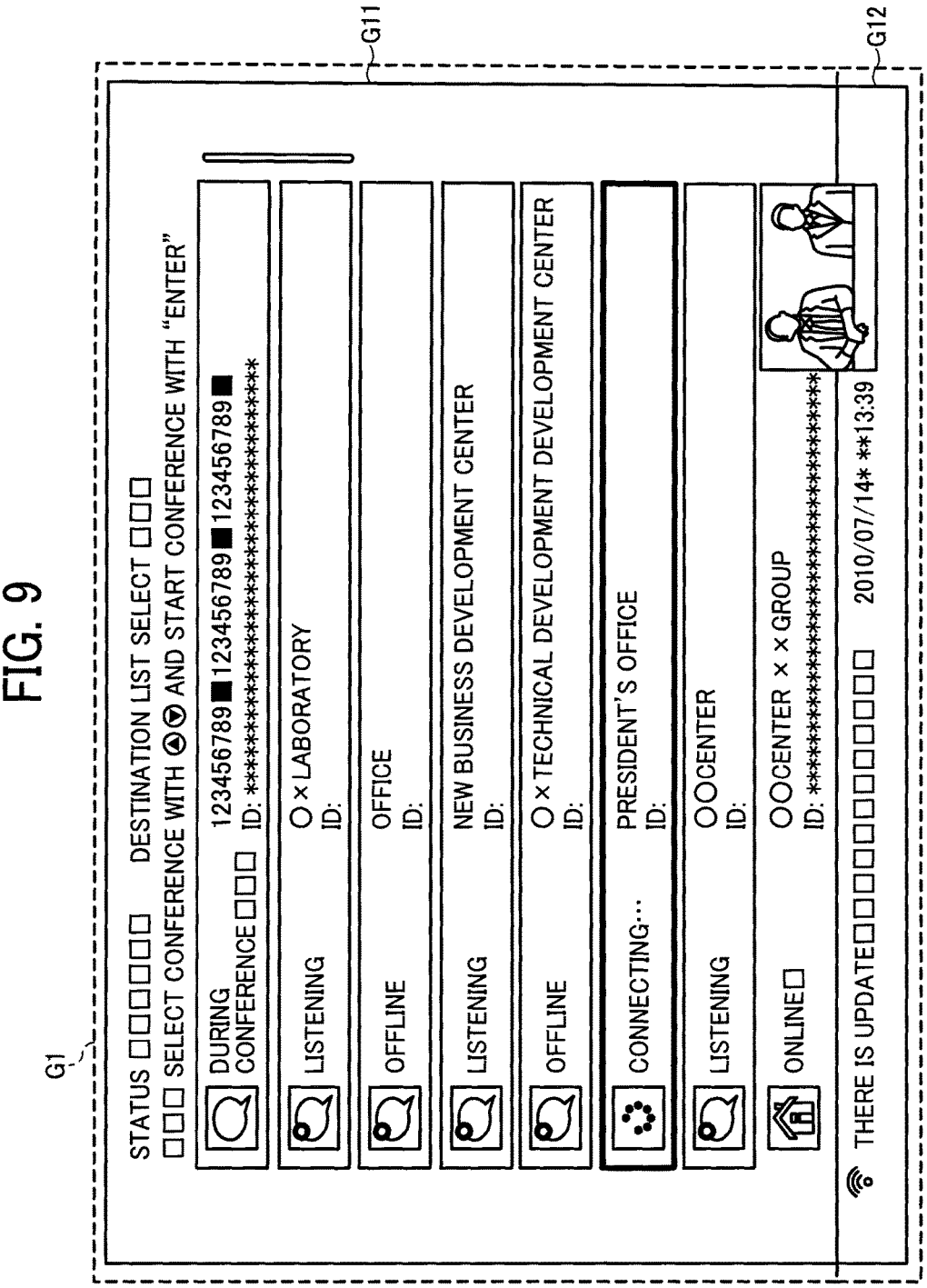
FIG. 9 is an example of a boot screen.

Details of the boot screen are described. FIG. 9 is a conceptual view illustrating an example of a boot screen G1. As illustrated in FIG. 9, the boot screen G1 is configured to include a main screen G11 displaying a list of the call states of the respective communication terminals and a status screen G12 displaying the status of the communication terminal. When the user notification unit 1104 is notified of the update-related information by the update unit 1103, the user notification unit 1104 displays the presence of the update on the status screen G12 so as to notify the user. As the display indicating the presence of the update, a previously set icon image can be displayed on the main screen G11 and a layout thereof is not limited to that illustrated in FIG. 9. In screen examples (FIGS. 9 to 12, 14, 15, etc.) as illustrated in the drawings, portions expressed by outlined or filled squares indicate regions on which a message is displayed possibly, and correspond to a message display region previously reserved on the system, for example.

When "true" is set in the "force_update" field among the data items contained as the update-related information, the user notification unit 1104 displays that the update present in the communication terminal is a forcible update on the boot screen G1 so as to notify the user. To be specific, the user notification unit 1104 can display that the update is the forcible update on the status screen G12 or display the list displayed on the main screen G11 in a gray-out fashion, so as to notify the user of invalidity of operations other than the update.

When the operation input reception unit 1105 of the user interface unit 1102 receives an operation direction for performing various settings, such as the update with the notification to the user at S12, the user interface unit 1102 displays a setting screen on the display 13 (step S13).

Figure 10:
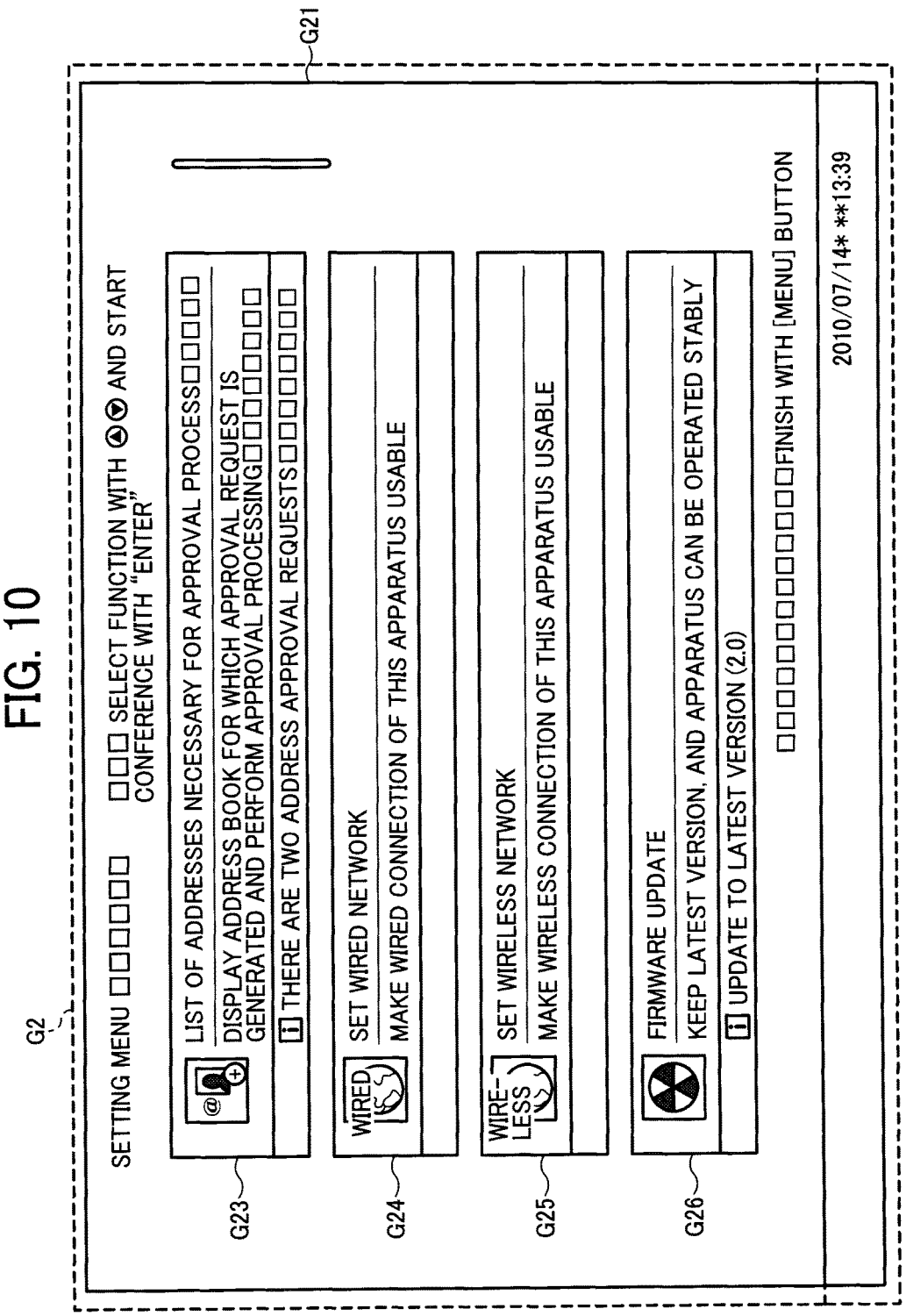
FIG. 10 is an example of a setting screen.

FIG. 10 is a conceptual view illustrating an example of a setting screen G2. As illustrated in FIG. 10, the setting screen G2 has a configuration including a main screen G21 displaying setting buttons G23 to G26 for receiving a selection operation by the user through the operation input reception unit 1105, and performing various settings. The setting button G26 among the setting buttons G23 to G26 is a button for initiating execution of an update. When the update-related information is not notified by the update unit 1103 and no update is present in the communication terminal, a selection operation of the setting button G26 is made invalid by displaying it in a gray-out fashion or the like. In contrast, when the update-related information is notified by the update unit 1103 and the update is present in the communication terminal, the gray-out of the setting button G26 is cancelled so as to make a state of receiving the selection operation by the user through the operation input reception unit 1105. In this case, a version number of the latest version to which the update is performed may be noted on the setting button G26 based on the description for the "version" as the data item contained as the update-related information. The example illustrated in FIG. 10 indicates that an update to the latest version having the version number of 2.0 is performed. It should be noted that a status screen displaying the status of the communication terminal can be displayed on the setting screen G2.

When the selection operation of the setting button G26 is performed at S13, the user interface unit 1102 displays a confirmation screen for confirming execution of the update on the display 13 (step S14).

Figure 11:
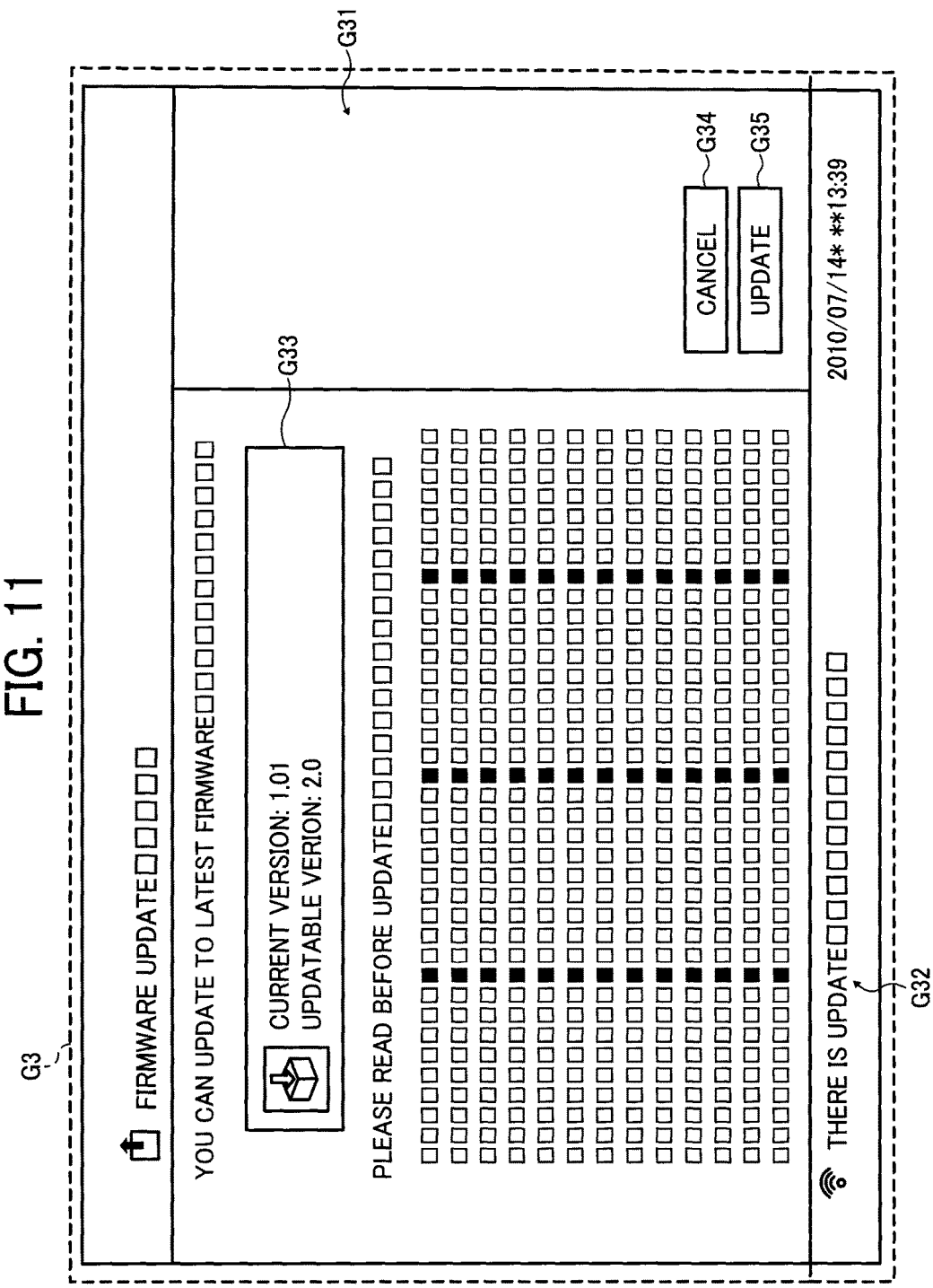
FIG. 11 is an example of a confirmation screen.

FIG. 11 is a conceptual view illustrating an example of a confirmation screen G3. As illustrated in FIG. 11, the confirmation screen G3 is configured to include an update display G33 displaying contents of the update that is executed, a main screen G31 containing operation buttons G34 and G35 for receiving directions to execute and cancel the update based on the contents from the user, and a status screen G32 displaying the status of the communication terminal. The current version as the version number of the program 104 of the terminal and pieces of information, such as the version number of the latest version to which the update is performed based on the description for the "version" as the data item contained as the update-related information, are displayed on the update display G33 so as to notify the user. Accordingly, the user can check the version number to which an update is performed from the display contents on the update display G33. It should be noted that information indicating whether a reboot is performed can be further displayed on the update display G33 of the confirmation screen G3.

Figure 12:
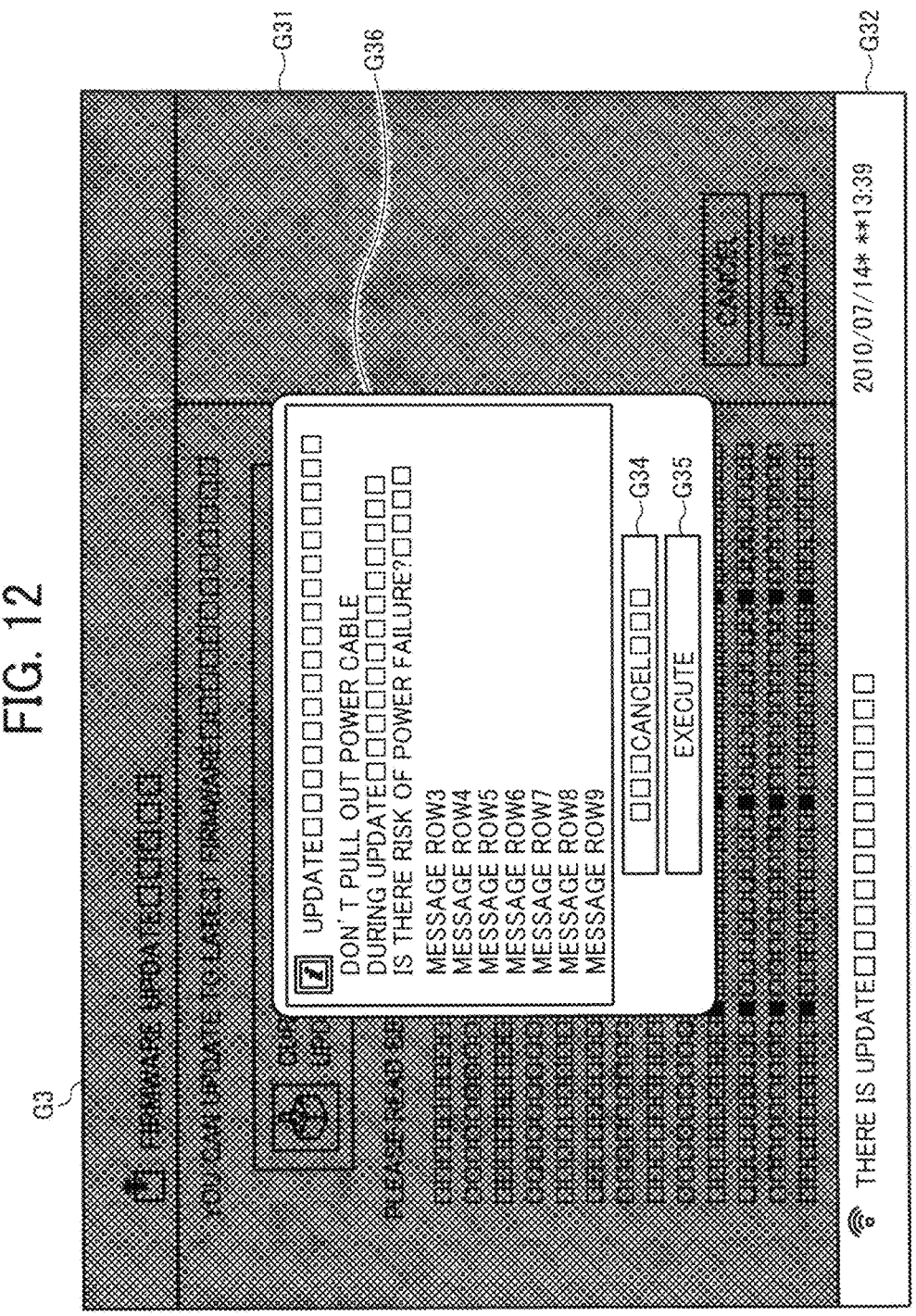
FIG. 12 is an example of a confirmation window.

FIG. 12 is a conceptual view illustrating an example of a confirmation window G36. When the operation button G35 for initiating execution of the update is selected on the confirmation screen G3, the confirmation window G36 for prompting the user to check again can be displayed. The pieces of information, such as the version number of the latest version to which the update is performed, previously set precautions at the time of the update, and the like, are displayed on the confirmation window G36. On the confirmation screen G3, the confirmation window G36 is displayed when the update is directed to be executed, so as to prompt the user to pay attention. It should be noted that the information indicating whether the reboot is performed can be further displayed on the confirmation window G36.

Returning back to FIG. 7, the update unit 1103 determines whether the update is executed based on the selection operation with the operation button G34 or G35 on the confirmation screen G3 (step S15). If the operation button G35 for directing to execute the update is selected (Yes at step S15), the update unit 1103 executes the update processing based on the acquired metadata (step S16).

If the operation button G35 is not selected in the case where the operation button G34 for cancelling the execution of the update is selected or the like (No at step S15), the update unit 1103 determines whether the forcible update is included in the updates that have not been executed based on the contents set in the "force_update" field in the acquired metadata (step S17). If the forcible update is included (Yes at step S17), the update unit 1103 performs termination processing of terminating processing of the communication terminal (step S18) and powers OFF the device. Even a call cannot be established unless the forcible update is executed. For avoiding this, the device is powered OFF so as to prevent wasteful operations from being made. On the other hand, if the forcible update is not included (No at step S17), the update unit 1103 does not execute the update at the current time and continues the normal operation. This enables the user to give preference to a call over the update.

That is to say, when the update of the communication terminal is present, the communication terminal 11 notifies the user of the presence of the update through the user notification unit 1104 of the user interface unit 1102. Then, in the communication terminal 11, the operation input reception unit 1105 receives the selection operation from the user indicating whether the update is executed. When the selection operation of executing the update is made, the update unit 1103 executes the update processing. Accordingly, when the update to be executed in the communication terminal is present, the communication terminal 11 enables the user to select to execute the update.

Figure 13:
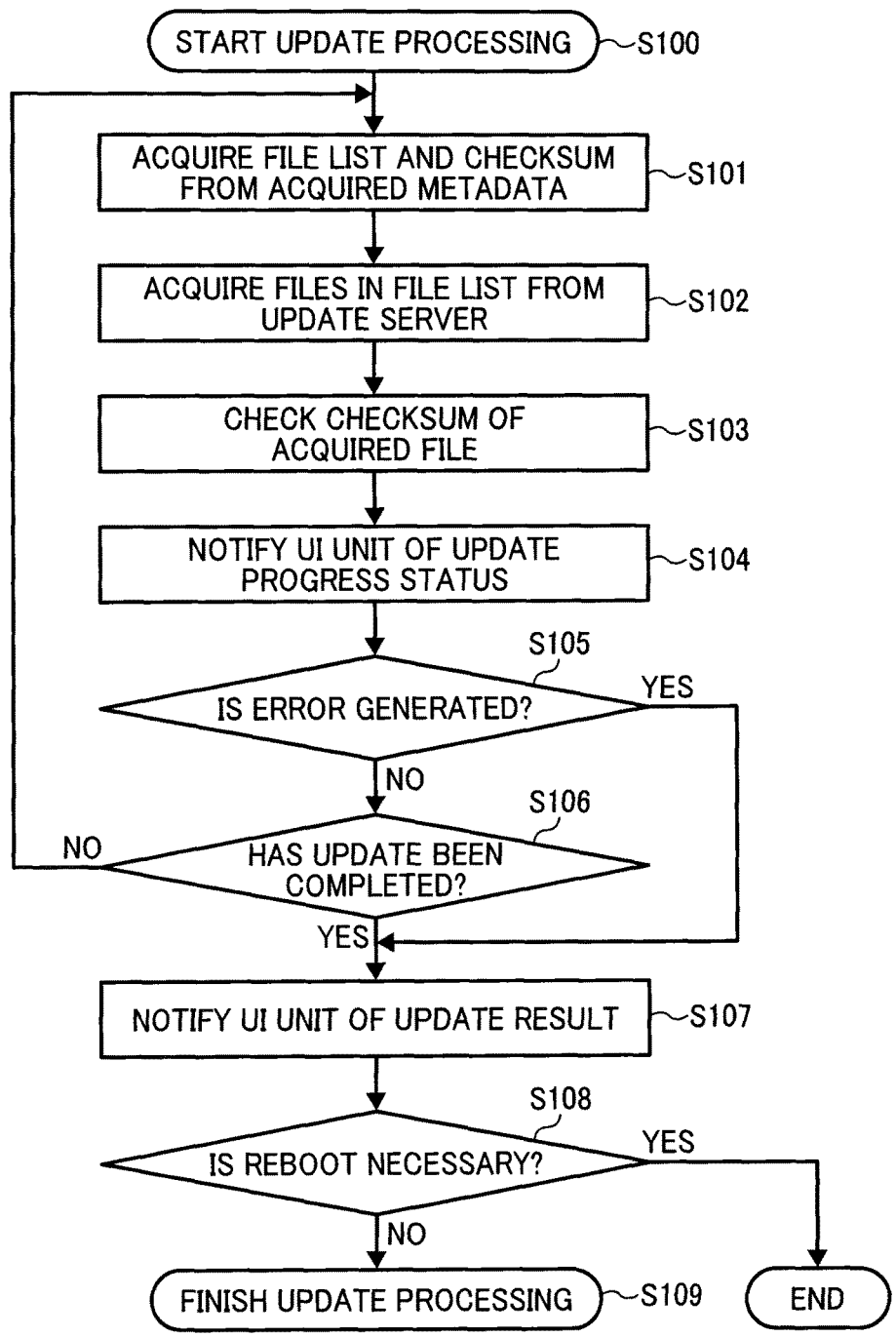
FIG. 13 is an example of update processing.

Details of the update processing (step S16) will now be described. FIG. 13 is a flowchart illustrating an example of the update processing.

As illustrated in FIG. 13, when the update processing is started (step S100), the update unit 1103 stops the functions of the interface units, including the image capturing element I/F 112 and the audio input/output I/F 113 for connecting with the external devices, including the camera 12, the microphone 14, and the speaker 15. When the interface units are operated, the update will have an error in some cases because the program 104 relating to the corresponding interface unit is being used. In order to prevent the error before it happens, the update unit 1103 stops the functions of the above-mentioned interface units with the start of the update processing.

Next, the update unit 1103 acquires a program file list as the entity of the update from the "files" in the acquired metadata and the checksums of these files (step S101). When pieces of metadata of a plurality of versions having the dependency relation are acquired, the pieces of processing at S101 to S106 are performed in order starting with the version having the oldest version number.

Subsequently, the update unit 1103 acquires the files on the file list acquired at S101 from the update server 60 (step S102), and checks the checksums of the acquired files (step S103). Then, the update unit 1103 notifies the user interface unit 1102 of an update progress status (step S104). The notification of the progress status is made for notifying the user interface unit 1102 of a file to which the pieces of processing at S102 and S103 have been finished, among the files contained in the file list. When the update of the versions having the dependency relation is performed, a version to which the update has been finished can be notified. The user interface unit 1102 displays the notified update progress status on the screen of the display 13 so as to notify the user.

Figure 14:
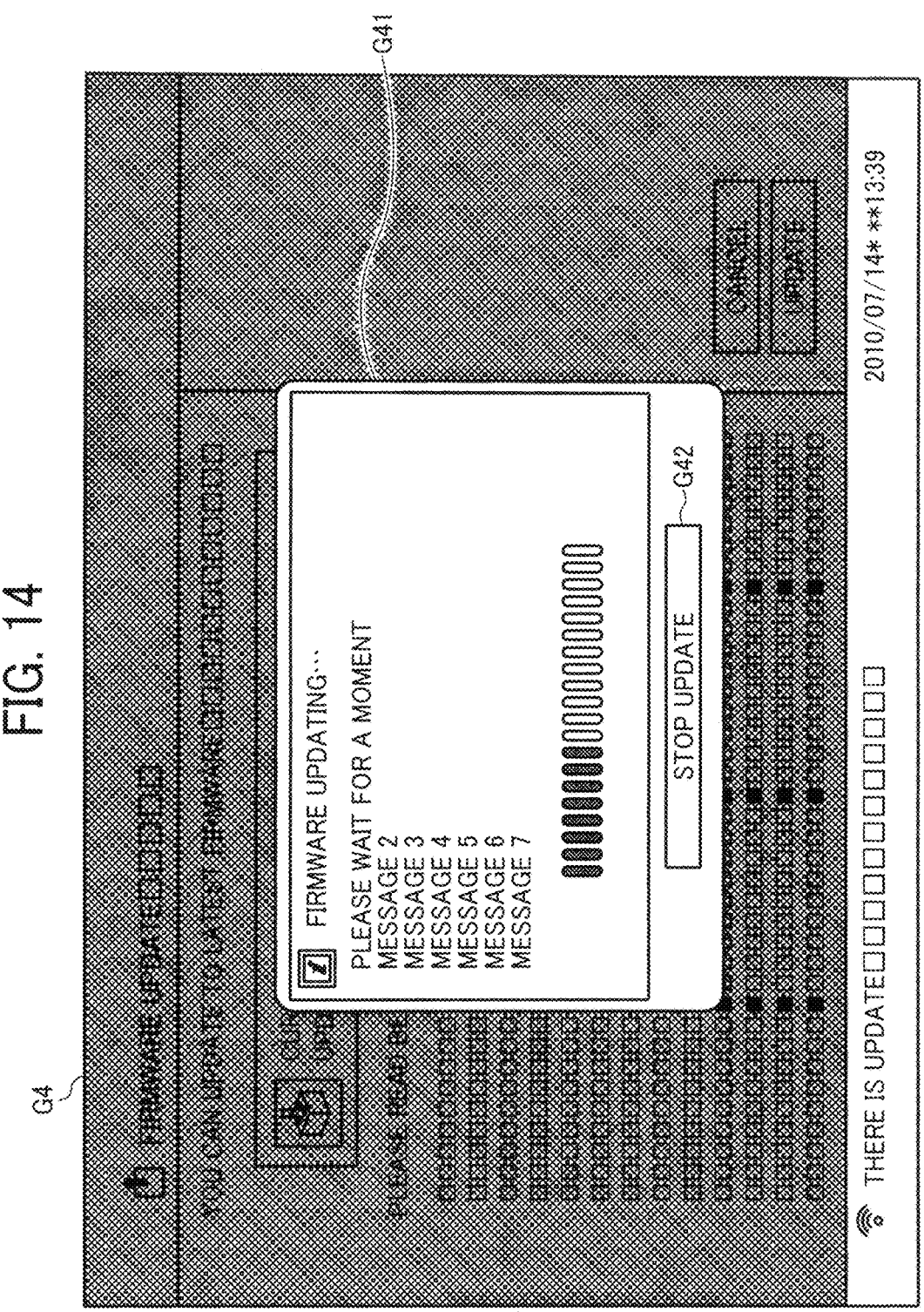
FIG. 14 is an example of an update screen.

FIG. 14 is a conceptual view illustrating an example of an update screen G4. As illustrated in FIG. 14, the update screen G4 is a screen displayed by the user interface unit 1102 on the display 13 during the update processing by the update unit 1103. On the update screen G4, an update status window G41 displaying the update progress status notified by the update unit 1103 and an operation button G42 for directing to stop the update are displayed. The user can check the update progress state with the display contents on the update status window G41.

In addition, remaining time of the update and a current line speed may be displayed on the update screen G4 in real time. This case provides an advantage that the user can grasp the update status more specifically.

Then, the update unit 1103 determines presence or absence of generation of an error (step S105). If the error is generated (Yes at step S105), the process advances to S107. At S105, the case in which a stopping of the update by the use of the operation button G42 on the update screen G4 and the case in which the version to which the update has been performed at S102 and S103 requires reboot are also determined as errors, in addition to an error that is generated during the update for some other reason (for example, based on the difference in the checksum at S103). Accordingly, when the update is performed in order starting with the version having the oldest version number, it is considered that the processing at 5101 to S106 has been experienced at a stage where the update to the version requiring the reboot has been performed.

If no error is generated (No at step S105), the update unit 1103 determines whether an update for all the versions relating to the acquired metadata has been completed (step S106). If the update for all the versions has not been completed (No at step S106), the process returns to S101 and the update processing is continued. If the update for all the versions has been completed (Yes at step S106), the process advances to S107.

At S107, the update unit 1103 notifies the user interface unit 1102 of the update result by the processing at S106 and S107. The user interface unit 1102 displays the notified update result on the screen of the display 13 so as to notify the user.

Figure 15:
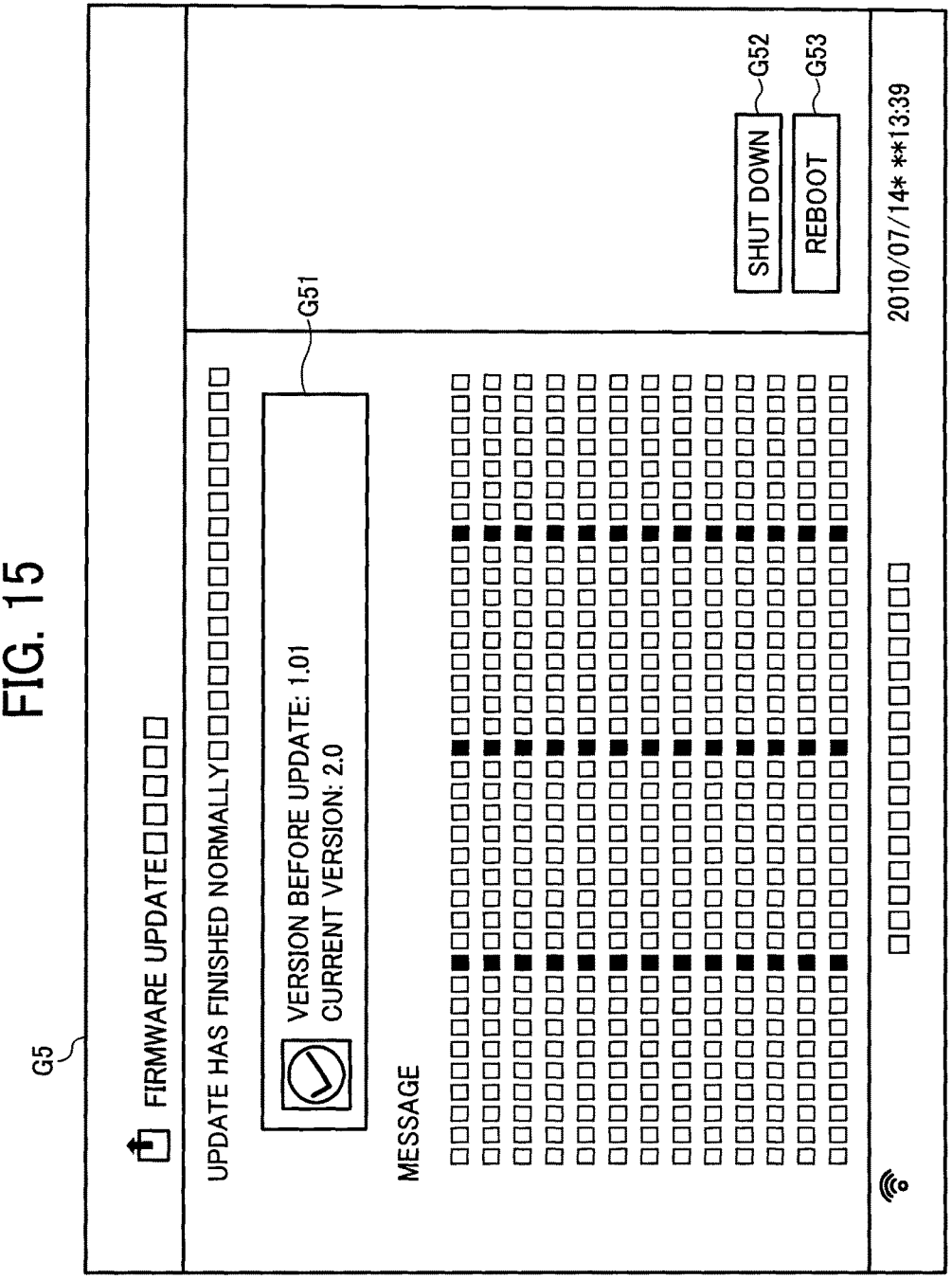
FIG. 15 is an example of the confirmation screen.

FIG. 15 is a conceptual view illustrating an example of a confirmation screen G5. As illustrated in FIG. 15, the user interface unit 1102 that has received the update result displays an update result G51 by the processing at S106 and S107, and operation buttons G52 and G53 for receiving an input operation of shutdown or reboot after the update on the confirmation screen G5. The information relating to the version before the update and the information relating to the current version by the update at S106 and S107 are displayed in the update result G51. The user can check the update result with the display contents in the update result G51.

Next, the update unit 1103 determines whether the reboot is necessary based on the setting in the "require_reboot" field that is contained in the metadata used for the update performed at S106 and S107 (step S108). If the reboot is not necessary (No at step S108), the update unit 1103 finishes the update processing without rebooting (step S109). If the reboot is necessary (Yes at step S108), the update unit 1103 reboots the communication terminal and finishes the processing (step S110). Thus, when the update requiring the reboot is executed, the reboot is made after the update, without an operation by the user.

Figure 16:
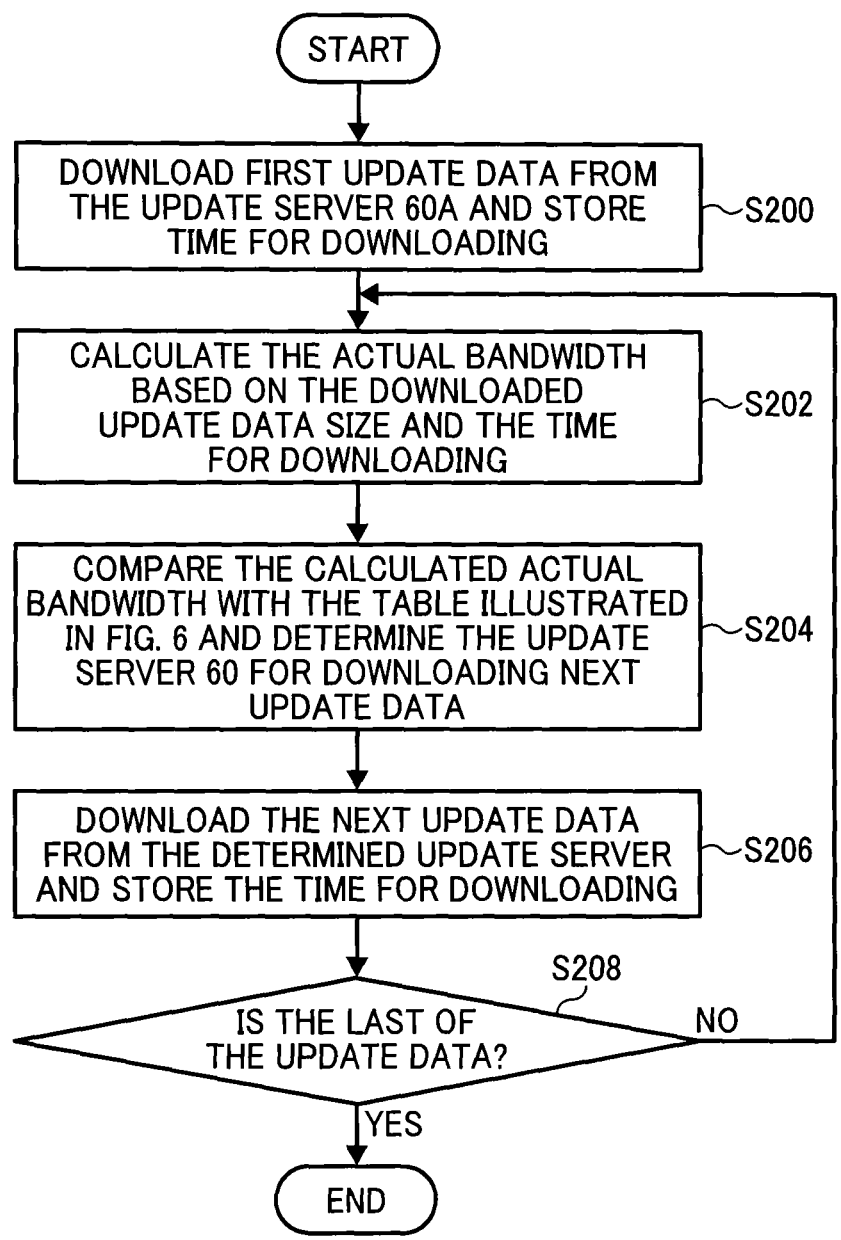
FIG. 16 is a flowchart illustrating an operation of downloading based on available bandwidth measured by the communication terminal.

Next, the following describes an example of operation of the communication terminal 11 when the communication terminal 11 executes downloading based on the actual bandwidth measured by the communication terminal 11. FIG. 16 is a flowchart illustrating an example of operations of the communication terminal. At first, the communication terminal 11 downloads first update data (updater) from the update server 60a, measures and stores time for downloading and the size of the downloaded update data as log information (step S200).

Next, the communication terminal 11 calculates the actual achieved bandwidth based on the downloaded update data size and the time for downloading (step S202).

Further, the communication terminal 11 compares the calculated actual bandwidth with the table illustrated in FIG. 6 (the bandwidth information table) and determines the update server 60 for downloading next update data (step S204). When the bandwidth of the available update server is low, the communication terminal 11 determines that the network is not stable and decides the update server 60 corresponding to the bandwidth that the bandwidth limitation is stricter than the actual bandwidth (the limited value of the bandwidth is low). After that, when the communication terminal 11 downloads within the full bandwidth, the communication terminal 11 selects another update server 60 corresponding to a bandwidth that is less tight than the current bandwidth in the bandwidth limitation (the limited value of the bandwidth is larger). On the other hand, when the communication terminal 11 does not download within the full bandwidth, the communication terminal 11 continues to use the current update server 60. Further, when the communication terminal 11 downloads within the bandwidth that is much lower than the limited value of the current bandwidth, the communication terminal 11 selects another update server 60 corresponding to the bandwidth that is tighter than the current bandwidth in the bandwidth limitation.

The communication terminal 11 downloads the next update data from the determined update server 60 and stores the time for downloading in the storage unit 204 (step S206).

The communication terminal 11 determines whether the downloaded data is the last portion of the update data (step S208). The communication terminal 11 returns to S202 when the downloaded data is not the last portion (step S208: No). The communication terminal 11 finishes the process when the downloaded data is the last portion (step S208: Yes).

Thus, the communication terminal 11 continues the download while adjusting to select the update server 60 until the communication terminal 11 finishes downloading the last of the data. In other words, the communication terminal 11 calculates the actual bandwidth after downloading the first of the update data when the communication terminal 11 has to download a plurality of the update data, and avoids network congestion by downloading the subsequent data based on the calculated bandwidth.

Figure 17:
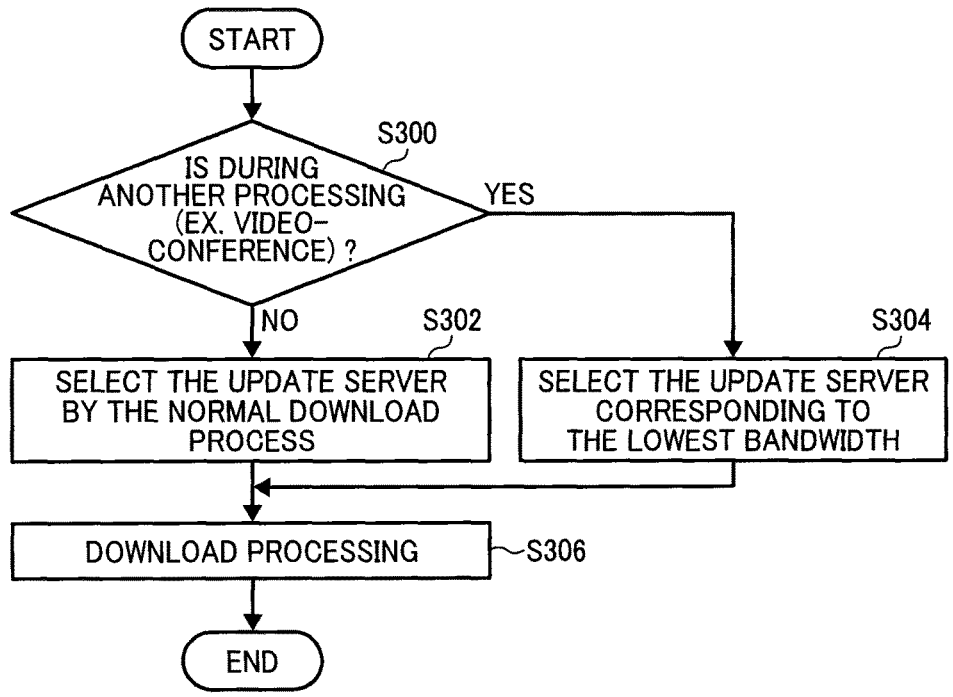
FIG. 17 is a flowchart illustrating an operation of downloading in the background when the communication terminal performs another processing.

FIG. 17 is a flowchart illustrating an example of download process performed in the background while the communication terminal 11 performs another processing (communication), for example, processing of a video-conference.

The communication terminal 11 determines whether the communication terminal 11 performs another processing, for example, processing of a video-conference before initiating the download (step S300). When the communication terminal 11 determines that the communication terminal 11 performs another processing (step S300: Yes), the communication terminal 11 selects the update server 60 corresponding to the lowest bandwidth to prevent the download from interrupting another data communication, for example, data communication of a video-conference (step S304). Further, when the communication terminal 11 determines that the communication terminal 11 does not perform another processing (step S300: No), the communication terminal 11 selects the update server by the normal download process illustrated in FIG. 16.

The communication terminal 11 then downloads (download processing) the update data from the selected update server 60 (step S306).

Figure 18:
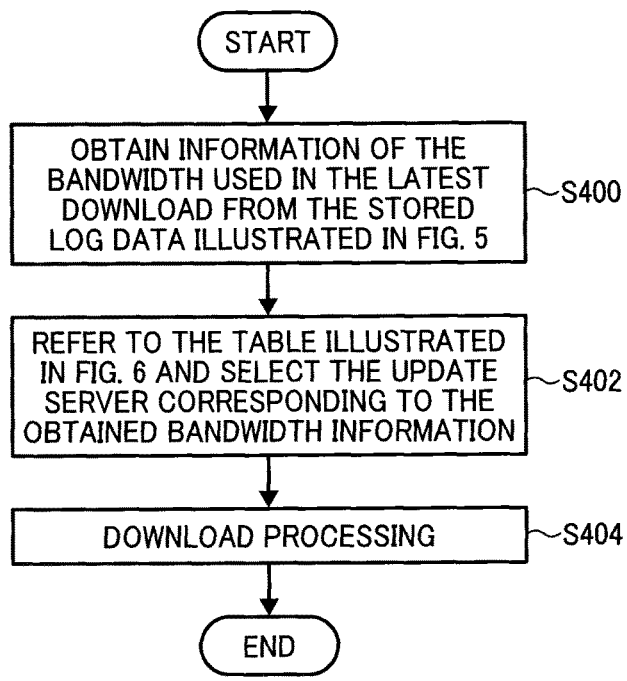
FIG. 18 is a flowchart illustrating an operation of resuming the download by the communication terminal.

FIG. 18 is a flowchart illustrating an operation of the communication terminal 11 when the communication terminal 11 resumes the download process. The communication terminal 11 obtains an average value of the bandwidth used for downloading the update data in the past from the stored log data illustrated in FIG. 5 (step S400). In other words, the communication terminal 11 obtains information of the bandwidth used in the latest download.

Next, the communication terminal 11 refers to the table illustrated in FIG. 6 (the table of the bandwidth information) and selects the update server 60 corresponding to the obtained bandwidth information (step S402). Next, the communication terminal 11 downloads (download processing) the update data from the selected update server based on appropriate bandwidth limitation (step S404).

To be specific, the communication system 1 may be a video phone system, an audio conference system, a voice phone system, a personal computer (PC) screen sharing system, or a telephone system including an internet protocol (IP) telephone and an Internet telephone. Furthermore, the communication system 1 may be a car navigation system. For example, one of the communication terminals 11 corresponds to a car navigation device automatically mounted on a car and the other of the communication terminals 11 corresponds to a management terminal or a management server of a management center managing the car navigation or a car navigation device mounted on another car. Moreover, the communication system 1 may be configured as a content distribution system that distributes video images, such as movies, dramas, television shows, and contributed moving images and electronic data, such as electronic books.

The remote communication management server 50 and the update server 60 in the above-mentioned embodiment may be constructed by a single computer or a plurality of computers to which the respective parts (functions or units) are arbitrarily assigned in a divided manner.

The division size determining unit 603 is not limited to be included in the update server 60 and may be included in the communication terminal 11.

The present inventions can be implemented in any convenient form, for example using dedicated hardware (circuitry), or a mixture of dedicated hardware and processors executing software. The present inventions can be implemented by one or more network processing circuits (e.g. CPUs) executing software programs. The network can comprise any conventional terrestrial or wireless communications network, such as the Internet. The processing circuits can compromise any suitably programmed circuits such as a general-purpose computer, personal digital assistant, mobile telephone (such as a WAP or 3G-compliant phone) and so on. Since the present inventions can be implemented by executing software, each and every aspect of the present inventions thus encompasses computer software executed on a programmable device. The computer software can be provided to the programmable device using any storage medium for storing processor-readable code, such as a floppy disk, hard disk, CD ROM, magnetic tape device, and solid state memory device.

The hardware platform includes any desired kind of hardware resources including, for example, a central processing unit (CPU), a random access memory (RAM), and a hard disk drive (HDD). The CPU may be implemented by any desired kind and any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, a cache memory of the CPU, and the RAM may function as a physical memory or a primary memory of the apparatus, while the HDD may function as a secondary memory of the apparatus.

Although the inventions have been described with respect to specific embodiments for a complete and clear disclosure, the appended claims are not to be thus limited but are to be construed as embodying all modifications and alternative constructions that may occur to one skilled in the art that fairly fall within the basic teaching herein set forth. For example, the update server 60 may calculate the actual available bandwidth based on the size of the update data and time for downloading.

The invention claimed is:

1. A communication system, comprising:
a communication terminal that stores an application operable on the communication terminal; and
a plurality of update servers that provide update data for updating the application to the communication terminal,
wherein the communication terminal includes
a memory that stores update server information comprising, for at least one update server of the plurality of update servers, an identifier of the update server stored in association with a communication bandwidth range;
processing circuitry that calculates an actual bandwidth obtained from a previous downloading of previous update data, determines an update server of the plurality of update servers for downloading next update data, based on the calculated actual bandwidth and the update server information stored in the memory, and downloads the next update data from the determined update server,
wherein the processing circuitry is further configured to determine a division size to be used to divide the next update data into a plurality of data items, based on the actual bandwidth, and download the next update data in accordance with the determined division size.

2. The communication system of claim 1, wherein the memory stores a time length of the previous downloading and an update data size of the previous downloading; and
wherein the processing circuitry calculates the actual bandwidth based on the time length and the update data size of the previous downloading stored in the memory.

3. The communication system of claim 2, wherein the actual bandwidth calculated by the processing circuitry is an average value of bandwidths used in a plurality of previous downloads.

4. The communication system of claim 1, wherein the processing circuitry selects another update server different from a current update server when the communication terminal determines that the communication terminal is performing processing that is different from the download of the next update data.

5. The communication system of claim 4, wherein the processing circuitry selects another update server associated with bandwidth information corresponding to a communication bandwidth that is lower than a current communication bandwidth stored in the memory, when the communication terminal determines that the communication terminal is performing processing different from the download of the next update data.

6. The communication system of claim 4, wherein the communication terminal is performing processing of a video-conference.

7. The communication system of claim 1, wherein the processing circuitry is further configured to compare the calculated actual bandwidth with the communication bandwidth range stored in the memory for each of the at least one update server, to determine the update server for downloading the next update data.

8. A communication apparatus, comprising:
a memory that stores an application operable on the communication apparatus and update server information comprising, for at least one update server of a plurality of update servers, an identifier of the update server stored in association a with communication bandwidth range;
a receiver that receives update data from one of a plurality of update servers that provide the update data for updating the application; and
processing circuitry that calculates an actual bandwidth obtained from a previous downloading of previous update data, determines an update server of the plurality of update servers for downloading next update data based on the calculated actual bandwidth and the update server information stored in the memory, and executes an update of the application based on the next update data received by the receiver from the determined update server,
wherein the processing circuitry is further configured to determine a division size to be used to divide the next update data into a plurality of data items, based on the actual bandwidth, and download the next update data in accordance with the determined division size.

9. A method of program update, comprising:
storing an application operable on a communication terminal and update server information comprising, for at least one update server of a plurality of update servers, an identifier of the update server stored in association with a communication bandwidth range in a memory of the communication terminal;
calculating an actual bandwidth obtained from a previous downloading of previous update data;
determining an update server of the plurality of update servers for downloading next update data based on the calculated actual bandwidth and the update apparatus information stored in the memory;
receiving update data from one of a plurality of update servers that provide the update data for updating the application; and
executing an update of the application based on the next update data received from the determined update server,
wherein the method further comprises determining a division size to be used to divide the next update data into a plurality of data items, based on the actual bandwidth, and downloading the next update data in accordance with the determined division size.

* * * * *